United States Patent
Nakatani et al.

(10) Patent No.: US 11,605,219 B2
(45) Date of Patent: Mar. 14, 2023

(54) IMAGE-PROCESSING DEVICE, IMAGE-PROCESSING METHOD, AND STORAGE MEDIUM ON WHICH PROGRAM IS STORED

(71) Applicant: NEC Corporation, Tokyo (JP)

(72) Inventors: Yuichi Nakatani, Tokyo (JP); Katsuhiko Kondoh, Tokyo (JP); Satoshi Segawa, Tokyo (JP); Michiru Sugimoto, Tokyo (JP); Yasushi Hidaka, Tokyo (JP); Junya Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/044,468

(22) PCT Filed: Mar. 27, 2019

(86) PCT No.: PCT/JP2019/013324
§ 371 (c)(1),
(2) Date: Oct. 1, 2020

(87) PCT Pub. No.: WO2019/194052
PCT Pub. Date: Oct. 10, 2019

(65) Prior Publication Data
US 2021/0142083 A1 May 13, 2021

(30) Foreign Application Priority Data
Apr. 2, 2018 (JP) .............................. JP2018-071143

(51) Int. Cl.
*G06V 10/98* (2022.01)
*G06N 20/00* (2019.01)
(Continued)

(52) U.S. Cl.
CPC ............. *G06V 10/98* (2022.01); *G06N 20/00* (2019.01); *G06V 30/153* (2022.01); *G06V 30/414* (2022.01); *G06V 30/416* (2022.01)

(58) Field of Classification Search
None
See application file for complete search history.

(56) References Cited

U.S. PATENT DOCUMENTS

2017/0185859 A1  6/2017 Nanaumi
2021/0012104 A1*  1/2021 Kondoh ............... G06V 30/413
(Continued)

FOREIGN PATENT DOCUMENTS

EP    1793338 A2    6/2007
JP    H05-258099 A   10/1993
(Continued)

OTHER PUBLICATIONS

International Search Report of PCT/JP2019/013324 dated Jun. 18, 2019 [PCT/ISA/210].
(Continued)

*Primary Examiner* — Dov Popovici
(74) *Attorney, Agent, or Firm* — Sughrue Mion, PLLC

(57) ABSTRACT

An image-processing device includes: a character string detection unit configured to detect a character string of a specific item in a first document image based on a feature amount of the displayed first document image among feature amounts which are recorded in advance based on a result of learning using a plurality of document images and indicate features of the character string of the item for each kind of document image and each specific item; and an output unit configured to output information regarding a correspondence relation indicating the same specific item between the first document image and a second document image displayed to correspond to the first document image.

8 Claims, 12 Drawing Sheets

(51) Int. Cl.
*G06V 30/148* (2022.01)
*G06V 30/414* (2022.01)
*G06V 30/416* (2022.01)

(56) References Cited

U.S. PATENT DOCUMENTS

| | | | |
|---|---|---|---|
| 2021/0012138 A1* | 1/2021 | Kondoh | G06V 30/418 |
| 2021/0027052 A1* | 1/2021 | Nakatani | G06Q 10/10 |

FOREIGN PATENT DOCUMENTS

| | | |
|---|---|---|
| JP | H11-282955 A | 10/1999 |
| JP | 2000-113100 A | 4/2000 |
| JP | 2002-007951 A | 1/2002 |
| JP | 2004-118380 A | 4/2004 |
| JP | 2015-005100 A | 1/2015 |
| JP | 2016-001399 A | 1/2016 |
| JP | 2016-048444 A | 4/2016 |
| JP | 2017-016549 A | 1/2017 |
| JP | 2017-054408 A | 3/2017 |
| JP | 2017-151627 A | 8/2017 |
| JP | 2018-005462 A | 1/2018 |
| WO | 2017/214073 A1 | 12/2017 |
| WO | 2018/003153 A1 | 1/2018 |

OTHER PUBLICATIONS

Japanese Office Action for JP Application No. 2020-177513 dated Nov. 16, 2021 with English Translation.
Extended European Search Report for EP Application No. EP19782081.4 dated Apr. 7, 2021.
Anonymous: "TopOCR", Mar. 17, 2018 (Mar. 17, 2018), pp. 1-4, XP055789686, Retrieved from the Internet: URL:https://web.archive.org/web/20180317190146/http://www.topocr.com/ [retrieved on Mar. 24, 2021].
Singaporean Office Action for SG Application No. 11202009652R dated Jun. 14, 2022.

* cited by examiner

FIG. 5

<RECORD TABLE>

| FORM ID | IMAGE DATA | RECORD CHARAC-TER STRING 1 | RECORD CHARAC-TER STRING 2 | RECORD CHARAC-TER STRING 3 | RECORD CHARAC-TER STRING 4 |
|---|---|---|---|---|---|
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

FIG. 8

W1 — RECEIPT

PAGE 001/001
DECEMBER 22, 2016
DELIVERY NOTE
NUMBER 473029369

DEAR AAA INDUSTRY CO., LTD.
DEVELOPMENT DIVISION
SECOND SECTION MANAGER YAMADA TARO
〒123-4567 OSU, SHIBUYA-KU, TOKYO
FOUR SEASONS BUILDING 5F
(03)1234-5678
¥ 196,592.-
ABCDEFGH
ORDER NUMBER: AB02512216 — C1a (SALES ORDER NUMBER
361-00020 GSD729)
(3610020)

USED PLACE: FOR AAA IN-HOUSE INSTALLATION
INSTALLATION SITE: SHIBUYA-KU, TOKYO

| ORDER NO. PAGE NO. | ITEM NAME | MODEL NO. | QUAN-TITY | QUANTITY UNIT PRICE | TOTAL PRICE |
|---|---|---|---|---|---|
| AB02512216 0001 | J06E-4LV-C2 | A20003-57026 | EA. | 1 18,500 | 18,500 |
| AB02512216 0002 | J0GE-STUD-UNIT | A20003-46405 | EA. | 1 2,500 | 2,500 |
| AB02512216 0003 | J0GE-CCPU-AI | A20003-46055 | EA. | 1 40,000 | 40,000 |
| AB02512216 0004 | J06F-2BR-A2 | A20003-46215 | EA. | 1 47,000 | 47,000 |
| AB02512216 0005 | IEZ-2BC-2D(WH) | A20003-61555 | EA. | 1 22,180 | 22,180 |
| AB02512216 0006 | AC-VO UNIT | A20003-53275 | EA. | 1 1,850 | 1,850 |
| AB02512216 0007 | J06E-PDV01B-1B | A20003-45360 | EA. | 1 50,000 | 50,000 |
| | SUBTOTAL | | | | 182,030 |
| | CONSUMPTION AND LOCAL CONSUMPTION TAXES | | | | 14,562 |
| | FOLLOWING MARGIN | | | | |
| | TOTAL | | | | 196,592 |

IT WAS ACCEPTED AS ABOVE.
DATA OF ACCEPTANCE DECEMBER 22, 2016
YOUR COMPANY NAME ○○ CO., LTD.
(DEPARTMENT NAME) SALES DEVELOPMENT
                   DEPARTMENT
(DEPARTMENT NAME) PROCUREMENT GROUP — C1b

YOUR COMPANY
SEAL

[SAMPLE
○○ DESIGN : 003
DEVELOPMENT P-300
MIN SEIN
GO GROUP]

W2

AAA CO., LTD.
1,080 YEN
196,592 YEN — C2a
△
△
◆
◆  ■
○○ CO., LTD. — C2b

IMAGE-PROCESSING DEVICE, IMAGE-PROCESSING METHOD, AND STORAGE MEDIUM ON WHICH PROGRAM IS STORED

CROSS REFERENCE TO RELATED APPLICATIONS

This application is a National Stage of International Application No. PCT/JP2019/013324 filed on Mar. 27, 2019, claiming priority based on Japanese Patent Application No. 2018-071143 filed on Apr. 2, 2018, the disclosure of which is incorporated herein in its entirely by reference.

TECHNICAL FIELD

The present invention relates to an image-processing device, an image processing method, and a storage medium on which a program is stored.

BACKGROUND ART

Patent Document 1 discloses a method of efficiently calculating optimum form formats for forms with regard to form formats. In this method, form formats are grouped and one representative form format is determined for each group. In this method, any one group is selected based on a feature-matching ratio between a read form image and a representative form format. Further, in this method, a form format with the highest feature-matching ratio with respect to the read form image is selected among the form formats in the selected group.

With regard to correction of a character recognition result, in Patent Document 2, when an unreadable character (a reject character) arises in character recognition in a case in which a plurality of kinds of forms are intermixed, a kind of form is designated which requires a process of correcting the unreadable character and a process of correcting the unreadable character in the designated kind of form is performed. In this way, a method of continuously performing a process of correcting the same kind of form is disclosed.

With regard to correction of a character recognition result, Patent Document 3 discloses that input content is displayed in accordance with a predetermined format when an image-input (character-recognized) form is corrected and checked, and a specific image portion corresponding to a received correction item is emphasized and displayed when a correction item is instructed by a user.

CITATION LIST

Patent Literature

[Patent Document 1]
Japanese Unexamined Patent Application, First Publication No. 2016-048444
[Patent Document 2]
Japanese Unexamined Patent Application, First Publication No. 2004-118380
[Patent Document 3]
Japanese Unexamined Patent Application, First Publication No. 2002-007951

SUMMARY OF THE INVENTION

Problems to be Solved by the Invention

When a character recognition result is checked and corrected, it is important for an operator who performs checking and correction to ascertain which item is shown and where the item is shown. In particular, when the operator usually checks and corrects a reading result of a document with a format unfamiliar, it may take some time to ascertain where an item which the operator desires to check is shown.

Accordingly, it is preferable to assist the operator to ascertain which item is shown and where the item is shown. At this time, it is preferable to perform assistance also even when the format of a character recognition target document is not known in advance.

An example objective of the present invention is to provide an image-processing device, an image-processing method, and a program capable of solving the above-described problems.

Means for Solving the Problems

According to a first aspect of the present invention, an image-processing device includes: a character string detection unit configured to detect a character string of a specific item in a first document image based on a feature amount of the displayed first document image among feature amounts which are recorded in advance based on a result of learning using a plurality of document images and indicate features of the character string of the item for each kind of document image and each specific item; and an output unit configured to output information regarding a correspondence relation indicating the same specific item between the first document image and a second document image displayed to correspond to the first document image.

According to a second aspect of the present invention, an image-processing method includes: detecting a character string of a specific item in a first document image based on a feature amount of the displayed first document image among feature amounts which are recorded in advance based on a result of learning using a plurality of document images and indicate features of the character string of the item for each kind of document image and each specific item; and outputting information regarding a correspondence relation indicating the same specific item between the first document image and a second document image displayed to correspond to the first document image.

According to a third aspect of the present invention, a storage medium stores a program causing a computer to perform processes of: detecting a character string of a specific item in a first document image based on a feature amount of the displayed first document image among feature amounts which are recorded in advance based on a result of learning using a plurality of document images and indicate features of the character string of the item for each kind of document image and each specific item; and outputting information regarding a correspondence relation indicating the same specific item between the first document image and a second document image displayed to correspond to the first document image.

Advantageous Effects of Invention

According to the present invention, even when the format of a character recognition target document is not known in advance, it is preferable to assist the operator to ascertain which item is shown and where the item is shown.

BRIEF DESCRIPTION OF THE DRAWINGS

FIG. 5 is a diagram illustrating an overview of a recording table stored in a database according to a first embodiment.

FIG. 8 is a diagram illustrating an example of a display screen on which a display unit displays display of record character strings and an image of a document form side by side according to the first embodiment.

FIG. 9 is a diagram illustrating an example of a display screen on which the display unit displays a correspondence relation between the display of the record character string and the image of the document form according to the first embodiment.

EXAMPLE EMBODIMENT

Hereinafter, embodiments of the present invention will be described, but the following embodiments do not limit the present invention described in the claims. All combinations of the characteristics described in the embodiments are not necessarily essential for solutions of the present invention.

Figure 1:
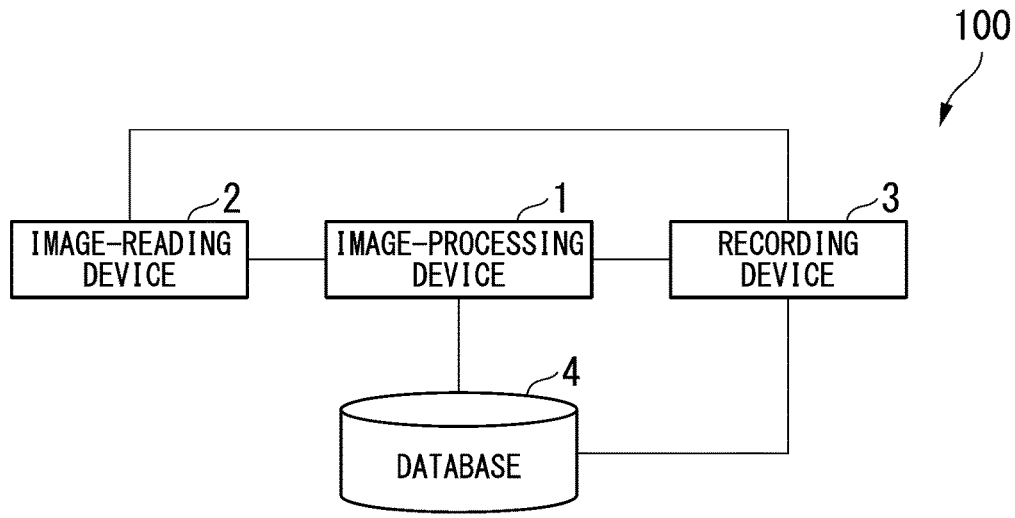
FIG. 1 is a diagram illustrating an example of a device configuration of an image-processing system including an image-processing device according to an embodiment.

FIG. 1 is a diagram illustrating an example of a device configuration of an image-processing system including an image-processing device according to an embodiment.

In the configuration illustrated in FIG. 1, an image-processing system 100 includes an image-processing device 1, an image-reading device 2, a recording device 3, and a database 4.

The image-processing device 1 is connected to the image-reading device 2 via a communication cable. The image-reading device 2 optically acquires image data such as document forms or the like and outputs the image data to the image-processing device 1. The image-processing device 1 performs an optical character recognition (OCR) process on the image data of the document form to recognize characters. The image-processing device 1 outputs a character recognition result to the recording device 3 and the recording device 3 records the character recognition result on a database.

Documents which are targets of the image-processing device 1 are not limited to specific kinds of documents. Various documents on which the OCR process can be performed can be set as processing targets of the image-processing device 1.

The database 4 is connected to the image-processing device 1 and the recording device 3. The database 4 stores a correspondence relation between image data of a plurality of document forms previously registered by the recording device 3 and record character strings indicating character strings which are recording targets among character strings included in the image data. The character strings indicated by the record character strings are important character strings which have to be recorded and stored on the database 4 among the character strings described in document forms. An operator who uses the image-processing system 100 registers image data of a plurality of document forms previously registered using the recording device 3 and record character strings among character strings included in the image data on the database 4 in advance.

The operator is referred to as a user of the image-processing device 1 or is simply referred to as a user.

The correspondence relation between image data of the document forms and information regarding the record character strings indicating character strings which are recording targets among information regarding character strings included in the image data is assumed to be recorded sufficiently with regard to many document forms on the database 4. In this state, the image-processing device 1 performs a process.

Figure 2:
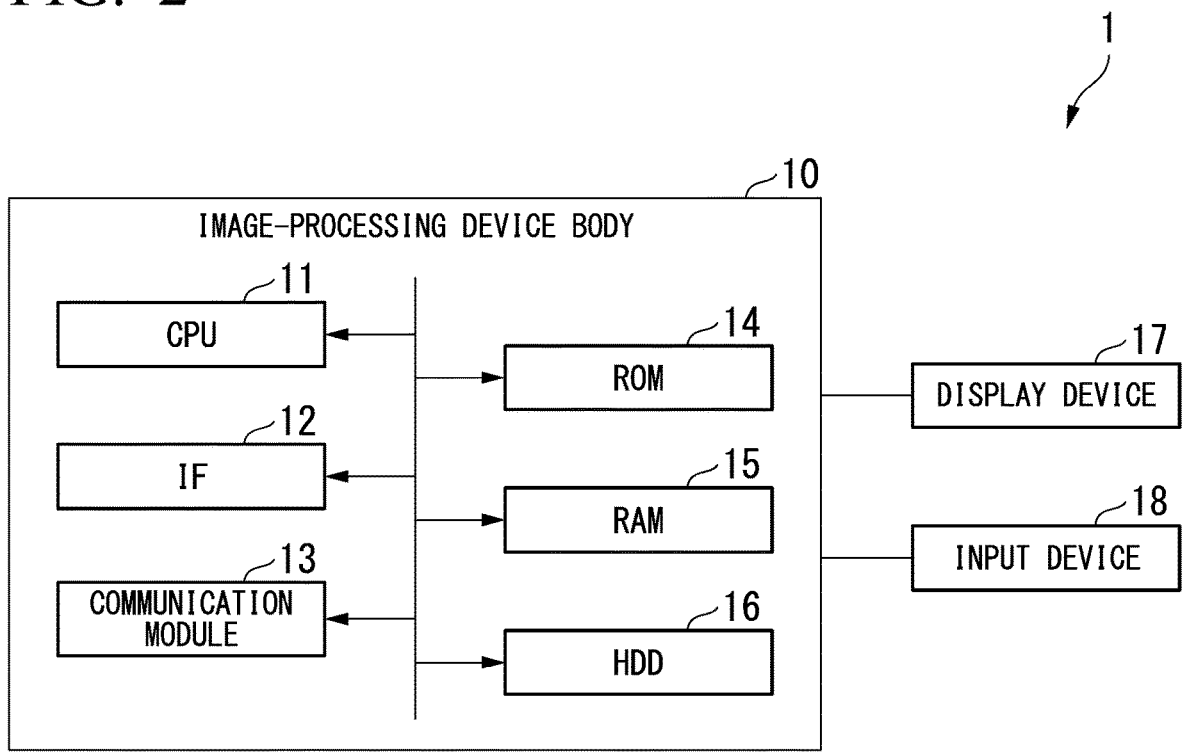
FIG. 2 is a diagram illustrating an example of a hardware configuration of the image-processing device according to the embodiment.

FIG. 2 is a diagram illustrating an example of a hardware configuration of the image-processing device.

In a configuration illustrated in FIG. 2, the image-processing device 1 includes an image-processing device body 10, a display device 17, and an input device 18.

The image-processing device body 10 is a computer that includes a central processing unit (CPU) 11, an interface (IF) 12, a communication module 13, a read-only memory (ROM) 14, a random-access memory (RAM) 15, and a hard disk drive (HDD) 16. The communication module 13 may perform wireless communication or wired communication with the image-reading device 2, the recording device 3, and the database 4 and may have both of these functions.

The display device 17 includes, for example, a display screen such as a liquid crystal panel or a light-emitting diode (LED) panel.

The input device 18 is, for example, a device such as a keyboard and a mouse, a touch sensor that is provided on a display screen of the display device 17, is included in a touch panel, or a combination thereof, and receives a user operation.

First Embodiment

Figure 3:
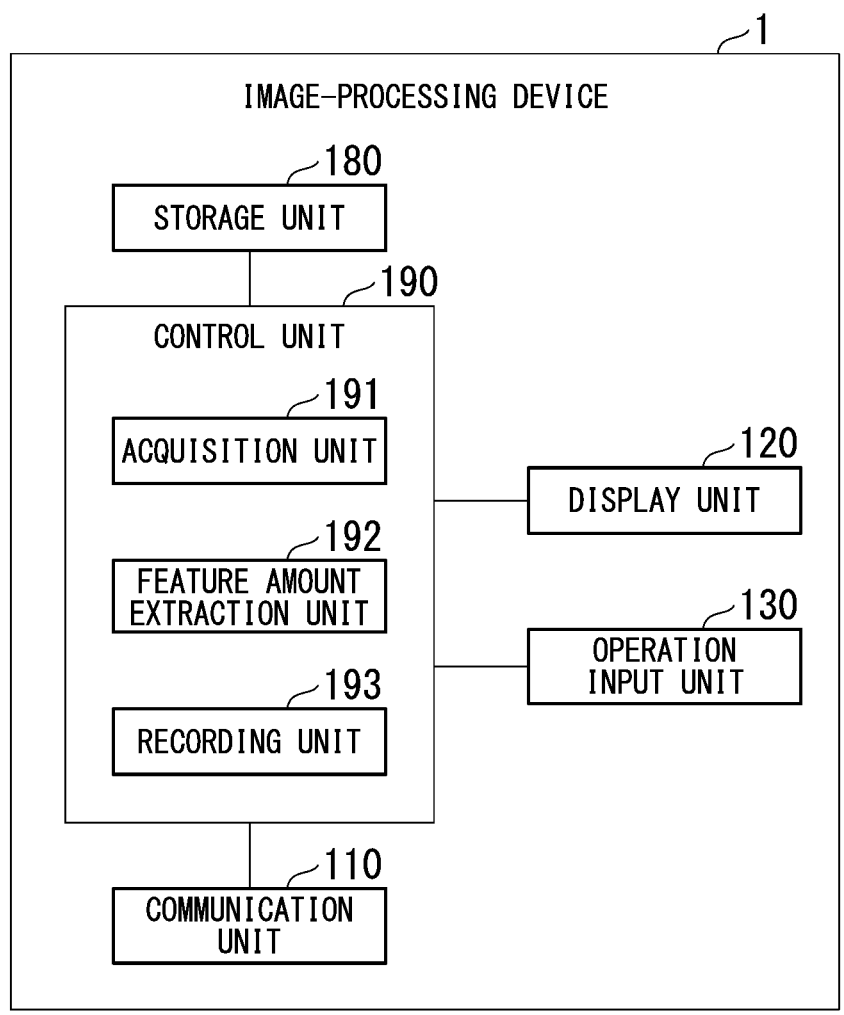
FIG. 3 is a schematic block diagram illustrating a functional configuration of an image-processing device according to a first embodiment.

FIG. 3 is a schematic block diagram illustrating a functional configuration of an image-processing device 1 according to a first embodiment.

A communication unit 110 is configured using the communication module 13 in FIG. 2 and communicates with another device. In particular, the communication unit 110 communicates with the image-reading device 2, the recording device 3, and the database 4.

A display unit 120 is configured using the display device 17 in FIG. 2 and displays various images. In particular, the display unit 120 corresponds to an example of an image output unit and outputs correspondence relation information indicating the same specific item between a first document image and a second document image displayed to correspond to the first document image.

For example, the display unit 120 displays an image of a document form (a raw image other than an OCR result) as a first document image and displays a graphical user interface (GUI) screen image in which a record character string which is a processing result of the image-processing device 1 is displayed in a predetermined format as a second document image. The display unit 120 indicates which character string that is a reading result in the first document image corresponds a character string in the second document image, by drawing a line between both the character strings.

Alternatively, when a correct character string of the record character string is obtained, the display unit 120 may display an OCR result of a document form as the first document image in the format of the document form and may display an image of a GUI screen in which the correct character string is displayed in the predetermined format as the second document image.

The display unit 120 may indicate which character string that is a correct in the first document image corresponds the character string shown in the second document image, by drawing a line between both the character strings.

Here, a method in which an output unit outputs an image and related information is not limited to the method of displaying the image and the related information. For example, the communication unit 110 may function as the output unit and transmit an image and related information to another device to display the image and the related information.

An operation input unit 130 is configured using the input device 18 in FIG. 2 and receives a user operation. In particular, the operation input unit 130 receives an operation of correcting a character string displayed by the display unit 120.

A storage unit 180 is configured using the ROM 14, the RAM 15, and the HDD 16 in FIG. 2 and stores various kinds of data.

A control unit 190 is configured by causing the CPU 11 in FIG. 2 to read a program from the storage unit 180 (the ROM 14, the RAM 15, and the HDD 16 in FIG. 2) and execute the program. The control unit 190 controls each unit of the image-processing device 1 such that various processes are performed.

An acquisition unit 191 acquires image data of a document form.

In particular, a feature amount extraction unit 192 extracts feature amounts of a character string from a recognition result of image data of a document form. For example, the feature amount extraction unit 192 extracts first feature amounts indicating features of a record character string included in image data of a document form for each piece of image data of the document form based on a recognition result of the image data of the plurality of document forms. Specifically, the feature amount extraction unit 192 specifies a record character string included in a document image processed through the character recognition and extracts the first feature amounts in the document image of the specified record character string. Specifying the record character string mentioned here means determining one of the character strings in a document form as one record character string. Extracting the feature amounts is also referred to as generating the feature amounts. The feature amounts of the record character string are, for example, values that quantitatively indicates predetermined features of the record character string of the specific item in a document image. The number of predetermined features may be plural.

A recording unit 193 extracts and records a record character string among information regarding character strings read from image data of new document forms by using feature amounts of the character strings in image data of the new document forms. In particular, the recording unit 193 corresponds to an example of a character string detection unit. The recording unit 193 detects a character string of a specific item in the first document image based on feature amounts of the displayed first document image (an image of a document form) among the feature amounts (first feature amounts) which are recorded in advance based on a result of learning obtained using a plurality of document images and indicate the features of a character string of a specific item for each kind of document image and for each specific item. That is, the recording unit 193 detects a character string of the specific item (a record character string) in accordance with the feature amounts of the character string included in the first document image.

The recording unit 193 detects a character string of the same item as the specific item in the first document image from the second document image. When the format of the second document image is known, the recording unit 193 detects a record character string in the second document image using information regarding the format. Conversely, when the format of the second document image is not known in the recording unit 193, the feature amount extraction unit 192 may extract the first feature amounts of the second document image and the recording unit 193 may specify the record character string using the obtained first feature amount.

A combination of the feature amount extraction unit 192 and the recording unit 193 corresponds to an example of a correspondence relation learning unit. The correspondence relation learning unit performs machine learning of a correspondence relation for the same specific item between the first and second document images.

For example, a case in which the format of the second document image is known in the recording unit 193 will be exemplified. In this case, the feature amount extraction unit 192 extracts feature amounts of a character string in the first document image (an image of a document form) through machine learning and the recording unit 193 specifies a record character string in the first document image based on the obtained feature amounts of the character string. Then, the record character strings of both the first and second document images are known in the recording unit 193, the recording unit 193 acquires a correspondence relation between the record character strings of the first and second document images.

Alternatively, when the format of the second document image is not known in the recording unit 193, the feature amount extraction unit 192 may extract feature amounts of the character string in the second document image in addition to the first document image. In this case, the recording unit 193 specifies the record character string based on the obtained feature amounts of the character string in each of the first and second document images. In this way, the record character strings of both the first and second document images are known in the recording unit 193, the recording unit 193 acquires a correspondence relation between the record character strings of the first and second document images.

The correspondence relation learning unit (the combination of the feature amount extraction unit 192 and the recording unit 193) may perform machine learning for the correspondence relation of the same specific item between the first and second document images using an image after the character string of the second document image is confirmed. When the character string of the second document image is confirmed, the confirmed character string is considered to be correct. The correspondence relation learning unit is expected to learn the correspondence relation of the same specific item between the first and second document images with relatively high precision by performing machine learning using the correct character string.

An image after the character string of the second document image is confirmed is, for example, an image for which the character string in the second document image corresponding to the character string of a specific item of the first document image is confirmed. When specific items of the first and second document images have been associated based on the feature amounts of the first and second document images, it is means that the character string in the second document image is confirmed.

Through such a process, the image-processing device 1 reduces an effort to record the character string information to be recorded included in the image data of a new document form.

Figure 4:
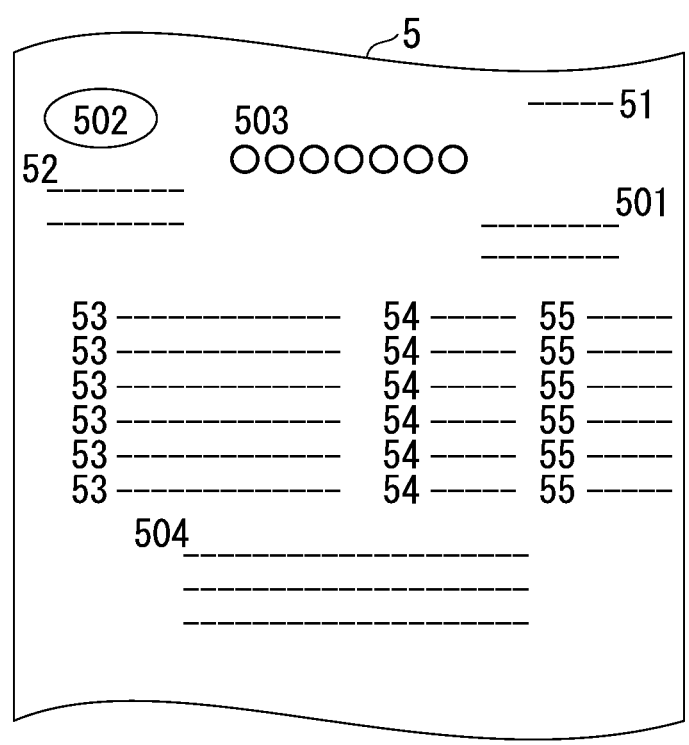
FIG. 4 is a diagram illustrating an example of a document form.

FIG. 4 is a diagram illustrating an example of a document form.

As illustrated in FIG. 4, in the document form, for example, a mark of a company generating the document, a creation date, a person in charge of creation, document content, and the like are described in a format specific to the document form. The document content indicates a single pair or a plurality of pairs of pieces of information such as names of ordered commodity and the number of ordered commodities, for example, when the document form is an order paper. The operator records a specific character string (a record character string) to be recorded among character strings described in the document form on the database 4 based on one certain document form using the recording device 3. Specifically, the operator inputs the record character string which the recording device 3 will record on the database 4, while seeing the document form. The operator causes the image-reading device 2 to read image data of the document form. The image-reading device 2 reads the document form based on an operation by the operator and outputs the document form to the image-processing device 1. Then, the recording device 3 records the image data of one document form and a record character string among character strings described in the document form on the database 4 in association therewith based on the operation by the operator and control of the image-processing device 1.

In the example of FIG. 4, items are, for example, a date and time 51, an order organization 52, a commodity name 53, a quantity 54, and an amount of money 55. In the example of FIG. 4, a character string of the date and time 51, the order organization 52, the commodity name 53, the quantity 54, and the amount of money 55 is a record character string. In the document form 5, other information such as a non-record character string which is not recorded by the operator is also printed. The information is, for example, a name 501 of an ordering party who issues the document form, an emblem image 502 of the ordering party, a title 503 of the document form, and a greeting 504.

FIG. 5 is a diagram illustrating an overview of a recording table stored in a database.

As illustrated in FIG. 5, in the database 4, a record table, in which image data of a document form is stored in association with a record character string among character strings described in the document form, is provided.

Figure 6:
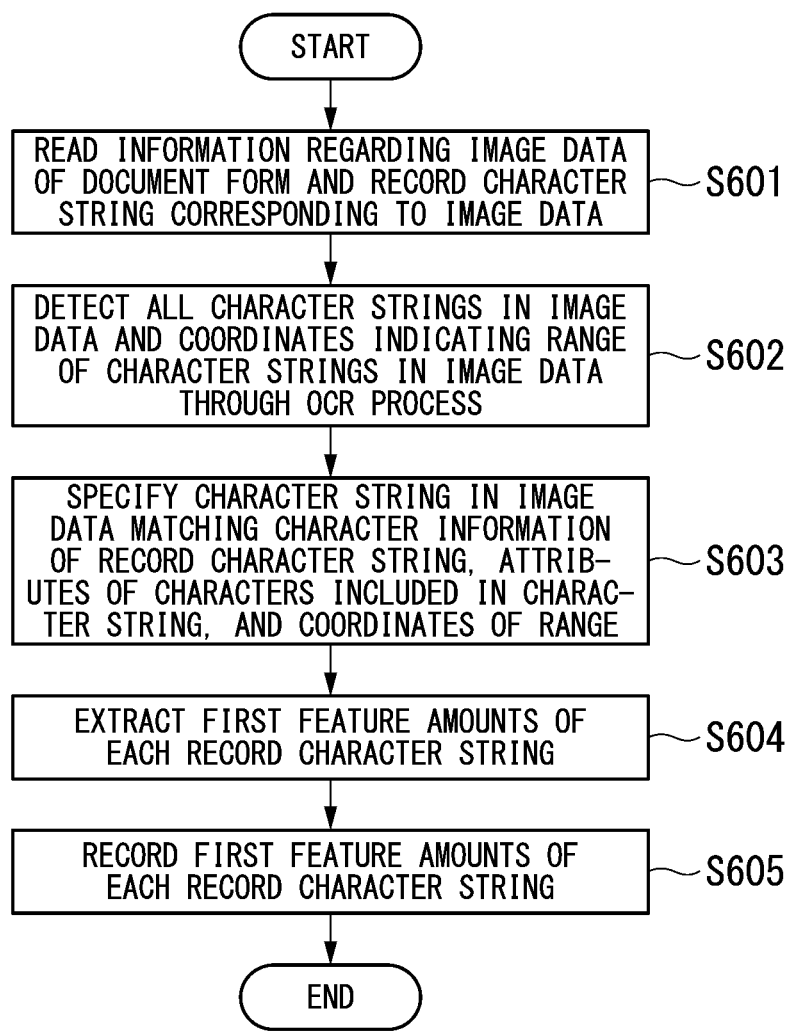
FIG. 6 is a first diagram illustrating a processing flow of the image-processing device according to the first embodiment.

FIG. 6 is a first diagram illustrating a processing flow of the image-processing device according to the first embodiment. FIG. 6 illustrates an example of a processing procedure in which the image-processing device 1 extracts first feature amounts.

Next, a processing flow of the image-processing device 1 will be described in order.

First, in the database 4, a plurality of combinations of image data of certain document forms with the same format and a record character string described in the document form are recorded. For example, a plurality of pieces of record character string information (information indicating the record character string) regarding the format of the document form 5 illustrated in FIG. 4 are assumed to be recorded.

As the combinations of the image data and the record character string information, for example, image data of document forms and record character string information handled in the past business can be used. When necessary amounts of image data and record character string information can be ensured from the past business, it is not necessary to separately prepare the image data and the record character string information in order for the image-processing device to acquire the first feature amounts.

In this state, the operator operates the image-processing device 1 and instructs the image-processing device 1 to start a process.

The acquisition unit 191 of the image-processing device 1 controls the communication unit 110 such that information regarding the image data of the document form and the record character string corresponding to the image data is read from the database 4 (step S601). The acquisition unit 191 outputs the image data and the record character string to the feature amount extraction unit 192.

The feature amount extraction unit 192 detects all the character strings in the image data and coordinates indicating a range of the character strings in the image data by performing an OCR process on the image data (step S602). The character string is a unity of characters formed by a plurality of characters. The feature amount extraction unit 192 analyzes the range of one unity in accordance with an interval or the like from other characters, extracts one character or a plurality of characters included in the range as a character string, and detects coordinates indicating the range of the character string in the image data. The characters included as the character string may include signs such as ideographs or phonographs, marks, and icon images.

The feature amount extraction unit 192 compares the character string extracted from the image data through the OCR process with the record character string read from the database 4 along with the image data. The feature amount extraction unit 192 specifies the character string in the image data matching character information of the record character string among the character strings extracted from the image data through the OCR process, attributes of characters included in the character string, and the coordinates of the range (step S603).

The attributes of the characters mentioned here (character attributes) are information expressed by numbers, alphabetical letters, hiragana letters, kanji, the number of characters, character heights, and fonts. The coordinates of the range of the character string are coordinates indicating a position of a character string in a document form. For example, the coordinates of the range of the character string may be information indicating coordinates of a first character, coordinates of an end character, or the like included in the character string. Hereinafter, the attributes of characters included in a character string and the coordinates of a range of the character string are collectively referred to as attributes of the character string or character string attributes.

The character information here may be only a character string or may include character string attributes. That is, the feature amount extraction unit 192 may determine whether the record character string and the character string in the image data are the same as the character strings. Alternatively, the feature amount extraction unit 192 may determine the sameness of the character string attributes in addition to the sameness of the characters.

When the feature amount extraction unit 192 cannot uniquely specify the character string in which the record character string matches the character information, the image-processing device 1 may exclude the document image from a processing target (an extraction target of the first feature amounts). Alternatively, the image-processing device 1 may cause the display unit 120 to display an image in which a range of each of candidates for the record character string is indicated by a frame and may cause to specify to the character string selected by the operator as record character string. The candidate for the record character string mentioned here is a character string associated with the record character string determined not to be uniquely specified among the character strings in which the character information matches the character information of the record character string. Specifying the record character string mentioned here means determining any one of the character strings in the document form as one record character string.

When the feature amount extraction unit 192 determines that the character information of each of the plurality of character strings in the document form matches the character information of one record character string, the plurality of character strings are candidates for the recording information. When the operator selects any one of the plurality of character strings, the record character string is uniquely specified.

Subsequently, the feature amount extraction unit 192 extracts feature amounts of each record character string which is common to the document forms with the same format by using the character string attributes extracted for each document form and for each record character string (step S604).

Specifically, the feature amount extraction unit 192 analyzes the character string attributes of the record character string in a plurality of document forms for each record character string and extracts one feature amount for one record character string. For example, the feature amounts of the record character string are, for example, values that quantitatively indicate predetermined features related to a format of the record character string in a document image.

A method in which the feature amount extraction unit 192 extracts the feature amount of each record character string which is common to a plurality of document forms with the same format is not limited to the specifying method. For example, the feature amount extraction unit 192 may obtain a mode for each item such as coordinates of a first character, coordinates of an end character, a kind of character, a height of a character, a kind of font, or the like with regard to the plurality of character string attributes obtained from the plurality of document forms. The feature amount extraction unit 192 may obtain an average or a median of attributes indicated by numerical values such as the coordinates of the first character, the coordinates of the end character, the heights of the characters, or distances between the characters for each item. The feature amount extraction unit 192 may use a feature amount including a range or a feature amount expressed as a plurality of numerical values, for example, by setting a maximum value and a minimum value in an item expressed as a numerical value as a feature amount. The feature amount extraction unit 192 may digitize attributes such as a kind of character or a kind of font other than numerical values and obtain the feature amount. The feature amount extraction unit 192 may extract the feature amount using a known machine learning algorithm.

When a plurality of numerical values are acquired with regard to one format of a document form and one record character string, the feature amount extraction unit 192 may vectorize the plurality of numerical values and extract a feature amount of one vector.

Feature amounts of each record character string which is common to a plurality of document forms with the same format and are extracted by the feature amount extraction unit 192 are referred to as first feature amounts. The feature amount extraction unit 192 uses a plurality of document forms with the same format to extract the first feature amounts of each record character string of the format. The first feature amounts are feature amounts used to extract a record character string. The first feature amount may include one of information indicating attributes of a character and the coordinates indicating a range of a character string, or a combination of the information and the coordinates.

The feature amount extraction unit 192 records the first feature amounts obtained for each record character string on the database 4 in association with an identifier of a format of a document form (step S605).

For example, the feature amount extraction unit 192 records the first feature amounts indicating the character attributes, the coordinates indicating the range of the character string, or the like of each of the date and time 51, the order organization 52, the commodity name 53, the quantity 54, and the amount of money 55 which are a record character string included in the format of the document form 5 in FIG. 4 on the database 4 in association with a format identifier of the document form 5.

After step S605, the image-processing device 1 ends the process of FIG. 6.

Through the above process, the image-processing device 1 can extract the information (the first feature amounts) used to reduce an effort to record the record character strings of the operator and accumulate the information in the database 4. Thus, the image-processing device 1 can receive an input of image data of a new document form and automatically record the record character strings included in the document form on the database 4. The process will be described with reference to FIG. 7.

Figure 7:
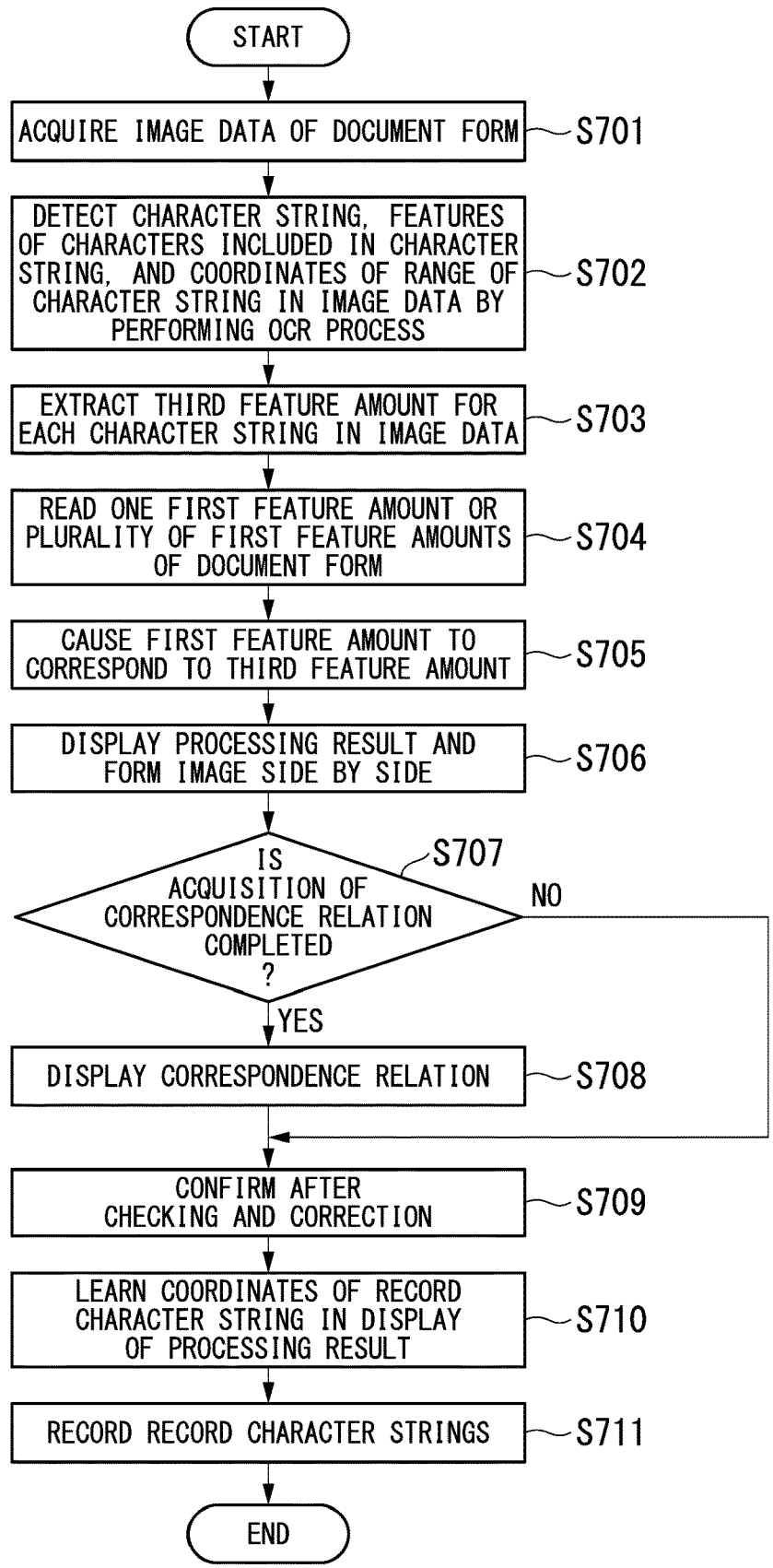
FIG. 7 is a second diagram illustrating a processing flow of the image-processing device according to the first embodiment.

FIG. 7 is a second diagram illustrating a processing flow of the image-processing device according to the first embodiment. FIG. 7 illustrates an example of a processing procedure in which the image-processing device 1 extracts the record character strings from newly input image data.

The operator performs an operation causing the image-reading device 2 to read a new document form. Then, the image-reading device 2 generates the image data of the document form and outputs (transmits) the image data to the image-processing device 1. The acquisition unit 191 of the image-processing device 1 acquires the image data from the data received by the communication unit 110 (step S701). The acquisition unit 191 outputs the image data to the feature amount extraction unit 192. The feature amount extraction unit 192 detects a character string, the features of the characters (the character attributes) included in the character string, and the coordinates of the range of the character string in the image data for each character string by performing the OCR process on the image data (step S702). The feature amount extraction unit 192 extracts third feature amounts obtained by processing the detected information as the feature amounts for each character string in the image data (step S703). That is, the third feature amounts are information indicating the features of the character string included in the document form of the newly read image data. Thereafter, the feature amount extraction unit 192 reads the first feature amounts of each record character string from the database 4 (step S704). The feature amount extraction unit 192 outputs the third feature amounts and the first feature amounts to the recording unit 193.

The recording unit 193 acquires the third feature amounts for each character string and the first feature amounts for each record character string in the image data and causes the first feature amounts to correspond to the third feature amounts (step S705). Specifically, the recording unit 193 causes the third feature amounts matching the first feature amount or the closest one third feature amount to correspond to each first feature amount. In the correspondence, the record character string is selected among the character strings obtained by performing the OCR process on the image data of the document form.

Subsequently, the feature amount extraction unit 192 controls the display unit 120 such that the display of the record character string which is the processing result by the image-processing device 1 and the image of the document form are displayed side by side (step S706).

FIG. 8 is a diagram illustrating an example of a display screen on which the display unit 120 displays the display of the record character string and the image of the document form side by side. In the example of FIG. 8, the display unit 120 displays an image W1 of the document form and a display window W2 of the record character string. The character strings of the OCR results of character strings C1a and C1b in the image W1 of the document form are respectively displayed as character strings C2a and C2b which are record character strings in the display window W2 of the record character strings. An icon B1 of an "OK" button is a button icon which the operator presses to confirm the record character strings after checking and correcting the record character strings shown in the display window W2 of the record character strings. The operator performs an operation of pressing the button icon, for example, by an operation of touching the button icon, a mouse clicking, or the like.

Subsequently, the recording unit 193 determines whether the acquisition of the correspondence relation between the display of the record character string and the image of the document form is completed (step S707). For example, the recording unit 193 determines that the acquisition of the correspondence relation is completed when the number of learnings for ascertaining the correspondence relation between the display of the record character string and the image of the document form is equal to or greater than a predetermined number of times. As described above, the learning for ascertaining the correspondence relation between the display of the record character string and the image of the document form may be learning for specifying the record character string in the display of the record character string or may be learning for specifying the record character string in the image of the document form. Alternatively, the learnings may be combined.

When it is determined that the acquisition of the correspondence relation between the display of the record character string and the image of the document form is completed (YES in step S707), the recording unit 193 controls the display unit 120 such that the correspondence relation between the display of the record character string and the image of the document form is displayed (step S708).

Figure 9:
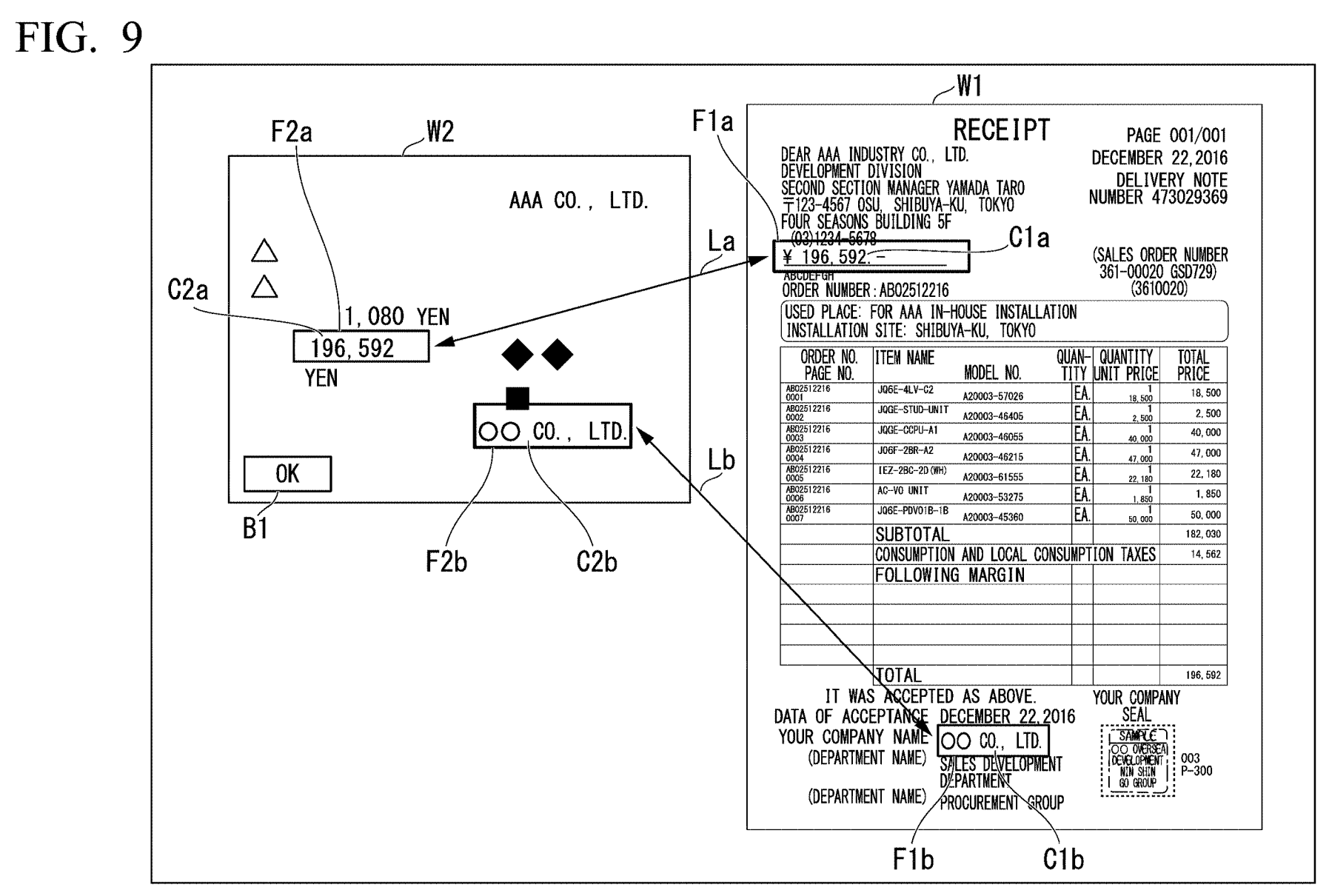

FIG. 9 is a diagram illustrating an example of a display screen on which the display unit 120 displays the correspondence relation between the display of the record character string and the image of the document form.

FIG. 9 illustrates an example in which the correspondence relation between the display of the record character string and the image of the document form is displayed on the display screen of FIG. 8. Character strings C1a, C1b, C2a, and C2b are surrounding by rectangles F1a, F1b, F2a, and F2b. A line La indicates correspondence between the character strings C1a and C2a. A line Lb indicates correspondence between the character strings C1b and C2b.

In this way, the display unit 120 displays the correspondence relation between the display of the record character string and the image of the document form. Thus, the operator can ascertain the correspondence relation between the character strings easily and reliably even when the operator is unaccustomed to one or both of the format of the document form and the format of the display window of the record character string.

When the operator performs the confirming operation after the checking and correcting the record character string, the image-processing device 1 acquires the corrected record character string (step S709). When the recording unit 193 determines in step S707 that the acquisition of the correspondence relation between the display of the record character string and the image of the document form is not completed (NO in step S707), the process proceeds to step S709.

Then, the feature amount extraction unit 192 and the recording unit 193 serving as a correspondence relation learning unit learn the coordinates of the record character string in the display of the processing result (in the examples of FIGS. 8 and 9, the display window W2 of the record character string) (step S710). For example, as in the case of the document form, the feature amount extraction unit 192 also extracts the first feature amounts of the display of the processing result and the recording unit 193 specifies and stores the position of the record character string using the first feature amounts.

When the format of the display of the processing result is known in the recording unit 193, the process of step S710 is unnecessary.

The recording unit 193 records the record character string in the record table in association with the identification information of the document form (step S711).

For example, a case in which the third feature amount a3, the third feature amount b3, the third feature amount c3, and the third feature amount d3 can be acquired from the image data of the document form will be exemplified. A case in which the third feature amount a3 matches the first feature amount a1 recorded in advance on a database, the third feature amount b3 matches the first feature amount b1, the third feature amount c3 matches the first feature amount c1, and the third feature amount d3 matches the first feature amount d1 will be exemplified. In this case, the recording unit 193 records the character strings corresponding to the third feature amount a3, the third feature amount b3, the third feature amount c3, and the third feature amount d3 as the record character strings on the record table of the document form. The character strings corresponding to the third feature amounts mentioned here are character strings of extraction sources of the third feature amounts. When the operator corrects the record character string, the recording unit 193 records the corrected record character string in the record table of the document form.

After step S711, the image-processing device 1 ends the process of FIG. 7.

The image-processing device 1 may update the first feature amounts in the document form in the process of FIG. 7. For example, the image-processing device 1 may learn the first feature amounts in the document form in step S710 in addition to or instead of the machine learning of the first feature amounts in the display of the processing result. In this case, the image-processing device 1 may re-perform the processing flow of FIG. 6. Alternatively, the image-processing device 1 may update the first feature amounts without re-performing the process on the data processed in FIG. 6 by performing additional learning in step S710.

The image-processing device 1 updates the first feature amounts through the process of FIG. 7 to increase the number of pieces of sample data and improve precision of the first feature amounts, and thus an improvement in precision in which the image-processing device 1 extracts the recording character strings is expected. When a record character string is added through the process of FIG. 7, the image-processing device 1 can also extract a newly added recording character string from image data. Thus, a reduction in the effort for the operator to input the character string is expected.

Through the process illustrated in FIG. 7, the image-processing device 1 can automatically record the record character strings in the image data of a newly input document form in accordance with the record character strings and the image data of the document form recorded in advance by the operator. Accordingly, the image-processing device 1 can reduce the effort for the operator to record the record character string in the document form. The operator can check and correct the record character string which is a processing result of the image-processing device 1 with reference to the display of the display unit 120. At this time, the display unit 120 displays the correspondence relation between the character string in the display of the processing result and the character string in the image of the document form, and thus the operator can easily ascertain the correspondence relation.

Second Embodiment

In a second embodiment, a case in which the image-processing device 1 treats a plurality of formats of a document form will be described.

Figure 10:
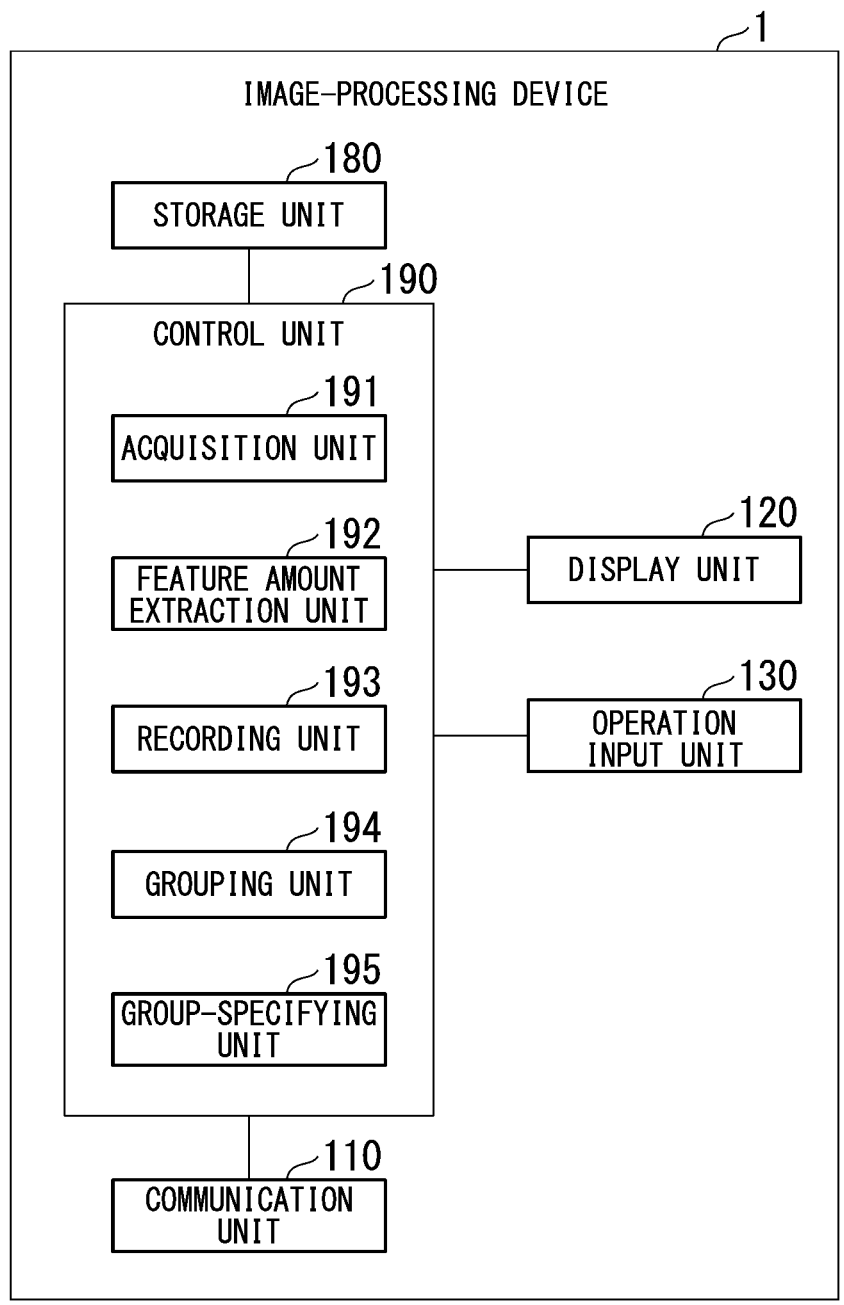
FIG. 10 is a schematic block diagram illustrating a functional configuration of an image-processing device according to a second embodiment.

FIG. 10 is a schematic block diagram illustrating a functional configuration of an image-processing device according to a second embodiment.

As illustrated in FIG. 10, the image-processing device 1 according to the second embodiment further has the functions of a grouping unit 194 and a group-specifying unit 195 in addition to each functional unit illustrated in FIG. 3.

Figure 11:
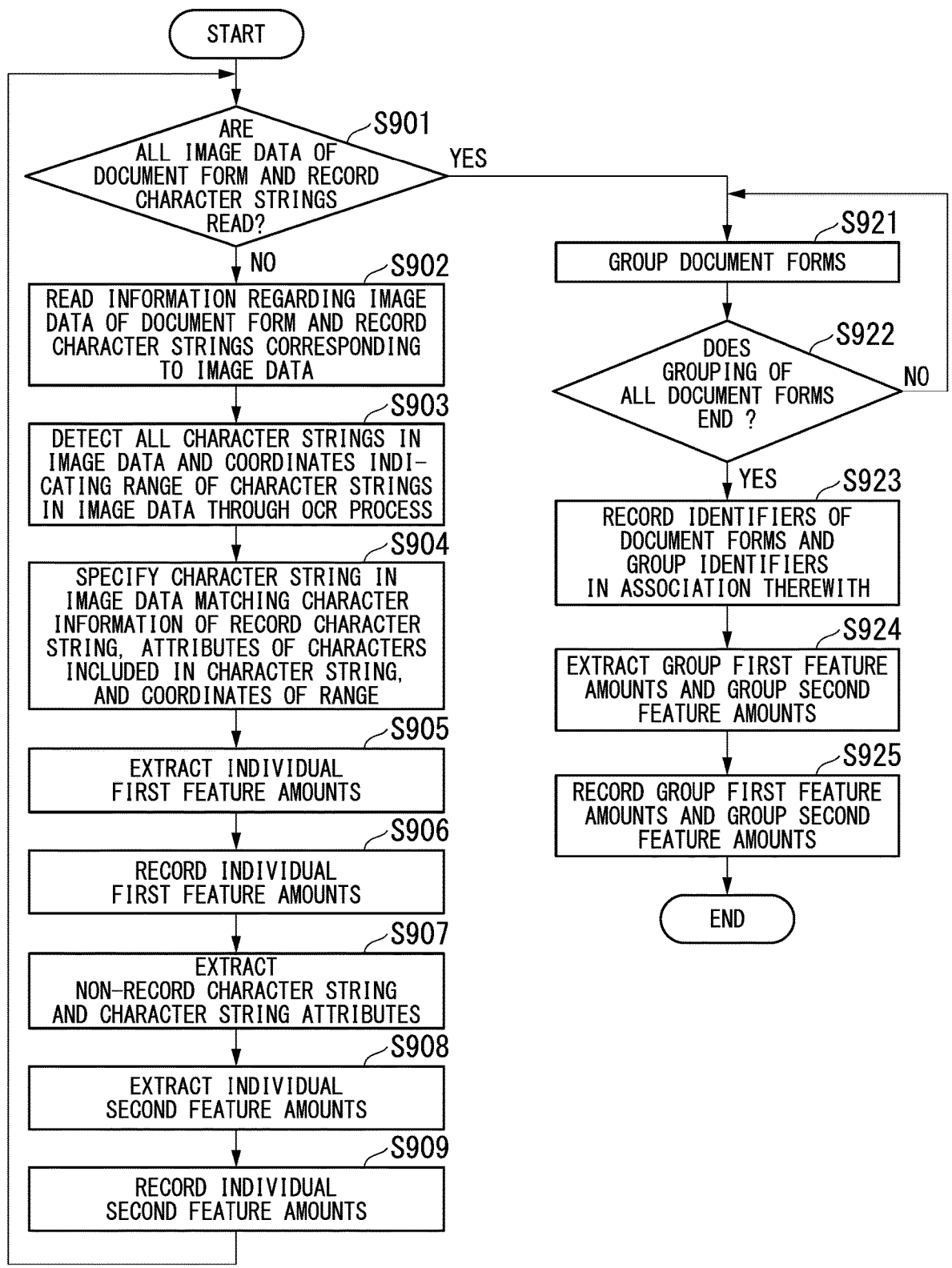
FIG. 11 is a first diagram illustrating a processing flow of the image-processing device according to the second embodiment.

FIG. 11 is a first diagram illustrating a processing flow of the image-processing device according to the second embodiment.

Next, a processing flow of the image-processing device 1 according to the second embodiment will be described in order.

A plurality of combinations of image data of a plurality of document forms with different formats and record character strings described in each document form are recorded for each document form on the database 4. In this state, the operator operates the image-processing device 1 and instructs the image-processing device 1 to start a process.

The acquisition unit 191 of the image-processing device 1 determines whether information regarding the image data of the document form and the record character strings corresponding to the image data is all read from the database 4 (step S901). In the case of NO, the acquisition unit 191 reads the information regarding the image data of the document form and the record character strings corresponding to the image data from the database 4 (step S902). The acquisition unit 191 outputs the image data and the record character strings to the feature amount extraction unit 192. The feature amount extraction unit 192 detects all the character strings in the image data and the coordinates in the image data by performing the OCR process on the image data (step S903). The character string is a unity of characters formed by a plurality of characters. The feature amount extraction unit 192 analyzes the range of one unity in accordance with an interval or the like from other characters, extracts one character string or a plurality of character strings included in the range as a character string, and detects coordinates indicating the range of the character string in the image data. The characters included as the character string may include signs such as ideographs or phonographs, marks, and icon images.

The feature amount extraction unit 192 compares the character string extracted from the image data through the OCR process with the record character string read from the database 4 along with the image data. The feature amount extraction unit 192 specifies the character string in the image data matching character information of the record character string among the character strings extracted from the image data through the OCR process, attributes of characters included in the character string, and the coordinates of the range (step S904).

As described in the first embodiment, the attributes of the characters are information expressed by numbers, alphabetical letters, hiragana letters, kanji, the number of characters, character heights, and fonts. The coordinates of the range of the character string are coordinates indicating a position of a character string in a document form. For example, the coordinates of the range of the character string may be information indicating coordinates of a first character, coordinates of an end character, or the like included in the character string. The attributes of characters included in a character string and the coordinates of a range of the character string are collectively referred to as attributes of the character string or character string attributes.

As in the case of the first embodiment, the character information here may be only a character string or may include character string attributes. That is, the feature amount extraction unit 192 may determine whether the record character string and the character string in the image data are the same as the character strings. Alternatively, the feature amount extraction unit 192 may determine the sameness of the character string attributions in addition to the sameness of the characters.

When the feature amount extraction unit 192 cannot uniquely specify the character string in which the record character string matches the character information, the image-processing device 1 may exclude the character image from a processing target (an extraction target of the first feature amount). Alternatively, the image-processing device 1 may cause the display unit 120 to display an image in which a range of each of candidates for the record character string is indicated by a frame and may specify the record character string to the character string selected by the operator. As described in the first embodiment, the candidate for the record character string mentioned here is a character string associated with the record character string determined not to be uniquely specified among the character strings in which the character information matches the character information of the record character string. Specifying the record character string mentioned here means determining any one of the character strings in the document form as one record character string.

When the feature amount extraction unit 192 determines that the character information of each of the plurality of character strings in the document form matches the character information of one record character string, the plurality of character strings are candidates for the recording information. When the operator selects any one of the plurality of character strings, the record character string is uniquely specified.

Subsequently, the feature amount extraction unit 192 extracts a feature amount of each document form and each record character string using the character string attributes extracted for each document form and each record character string (step S905). Specifically, the feature amount extraction unit 192 processes the character string attributes of the character string associated with the record character string in step S904 as the feature amounts. A plurality of kinds of formats are set as targets in the second embodiment. For this reason, the first feature amounts cannot be extracted directly unlike the case of step S604 of FIG. 7 at the time point of step S905 in which the document forms are not grouped for each format. Accordingly, the feature amount extraction unit 192 extracts the feature amounts for each document form and each record character string as preparation to extract the first feature amounts of each group. The feature amounts of each document form and each record character string are referred to as individual first feature amounts.

The feature amount extraction unit 192 records the obtained individual first feature amounts on the database 4 in association with the identifier of the document form and the identifier of the record character string (step S906). As the identifier of the record character string, for example, coordinate values indicating the position of the record character string can be used.

For example, the feature amount extraction unit 192 records the individual first feature amounts indicating the character attributes, the coordinates indicating the range of the character string, or the like of each of the date and time 51, the order organization 52, the commodity name 53, the quantity 54, and the amount of money 55 which are the record character string included in the format of the document form 5 in FIG. 4 on the database 4 in association with the identifier of the document form 5 and the identifier of the record character string for each document form and each record character string.

The feature amount extraction unit 192 extracts a non-record character string in the image data which does not match the character information included in the record character string and character string attributes of the non-record character string (step S907).

As described above, the non-record character string is a character string which is not recorded by the operator, that is, a character string other than the record character string. The character string attributes may include one or both of information indicating the attributes of the characters included in the character string and information indicating the coordinates of the range of the character string.

The feature amount extraction unit 192 extracts the feature amounts of each document form and each non-record character string using the character string attributes extracted for each document form and each non-record character string (step S908).

Specifically, the feature amount extraction unit 192 processes the attributes of each character string (the character string attributes) of the character string not associated with any record character string in step S904 as the feature amounts. As in the first feature amounts, the feature amounts common to the document forms with the same format cannot be generated at the time point of step S908 in which the document forms are not grouped for each format. Thus, the feature amount extraction unit 192 extracts the feature amounts for each document form and each non-record character string as preparation to extract the second feature amounts of each group. The feature amounts of each document form and each non-record character string are referred to as individual second feature amounts.

The feature amount extraction unit 192 may generate the individual second feature amounts in which the plurality of non-record character strings are collected for each document form. For example, the feature amount extraction unit 192 may generate one individual second feature amount for one document form.

The feature amount extraction unit 192 records the obtained individual second feature amounts on the database 4 in association with the identifier of the document form and the identifier of the non-record character string (step S909). As the identifier of the non-record character string, for example, coordinate values indicating the position of the non-record character string can be used.

For example, the feature amount extraction unit 192 records the individual second feature amounts indicating the name 501 of an ordering party, the emblem image of the ordering party, the title 503 of the document form, and the greeting 504 which are the non-record character string included in the format of the document form 5 in FIG. 4 on the database 4 in association with the identifier of the document form 5 and the identifier of the non-record character string.

The information regarding the image data of the document form with each format and the record character string corresponding to the image data are recorded on the database 4 in association with each of the plurality of formats of the document forms. The acquisition unit 191 of the image-processing device 1 repeats the processes of steps S901 to S909 until the information regarding the image data and the record character string in all the document forms is read.

When it is determined in step S901 that the acquisition unit 191 reads all the information regarding the image data of the document forms and the record character string corresponding to the image data from the database 4 (YES in step S901), the grouping unit 194 groups the document forms (step S921). The grouping unit 194 groups the document forms based on the individual second feature amounts included in the image data of the document forms. For example, the grouping unit 194 groups the document forms based on the degree of matching of the non-record character strings indicated by the individual second feature amounts, the degree of matching between the emblem images, the degree of matching between the coordinate ranges of the non-record character strings, or the like. For example, the grouping unit 194 groups the plurality of document forms based on correlation between the individual second feature amounts in the plurality of document forms. Alternatively, for example, the grouping unit 194 groups the plurality of document forms based on similarity between the individual second feature amounts of the plurality of document forms. The grouping unit 194 determines the group identifiers of the document forms in the grouping process. The grouping unit 194 determines whether the grouping of all the document forms ends (step S922).

The grouping unit 194 repeats the process of step S921 when the grouping of all the document forms is not completed. Specifically, when the grouping unit 194 determines in step S922 that there is a document form which has not been grouped (NO in step S922), the process returns to step S921.

When the grouping unit 194 completes the grouping of all the document forms (YES in step S922), a group table (a record table) of the database 4 is recorded in association with identifiers of the document forms and group identifiers granted to the document forms (step S923).

Then, the feature amount extraction unit 192 reads each individual first feature amount and each individual second feature amount of one document form or a plurality of document forms belonging to a certain group from the database 4. The feature amount extraction unit 192 extracts each group first feature amount and each group second feature amount corresponding to each individual first feature amount and each individual second feature amount of the document form belonging to the group (step S924).

Each group first feature amount may be a value such as an average of the individual first feature amounts of the document form belonging to the group. Similarly, each group second feature amount may be a value such as an average of the individual second feature amounts of the document form belonging to the group. Each group first feature amount and each group second feature amount may not be an average of the individual first feature amounts or an average of the individual second feature amounts. That is, each group first feature amount and each group second feature amount may be extracted using any scheme as long as the feature amounts are feature amounts calculated so that the record character strings or the non-record character string of one document form or the plurality of document forms belonging to the group can be specified using a scheme such as predetermined statistical processing or machine learning.

For example, the feature amount extraction unit 192 may extract the character string attributes of each record character string from the plurality of document forms belonging to the same group and (directly) generate the group first feature amount in step S924. In this case, the feature amount extraction unit 192 passes the extraction and the recording of the individual first feature amounts in steps S905 and S906 (does not particularly perform any process).

Conversely, the feature amount extraction unit 192 extracts the individual second feature amounts in step S908 so that the individual second feature amounts can be used in the grouping in step S921. Here, in step 921, the grouping unit 194 may group the document forms using the non-recording character strings without using the individual second feature amounts. In this case, the feature amount extraction unit 192 may (directly) extract the group second feature amounts from the character string attributes of the non-record character strings of the plurality of document forms belonging to the same group in step S924. In this case, the feature amount extraction unit 192 does not particularly perform any process in steps S907 to S909.

The feature amount extraction unit 192 calculates each group first feature amount and each group second feature amount for each group and records each group first feature amount and each group second feature amount on the database 4 in association with the identifiers of the groups (step S925).

After step S925, the image-processing device 1 ends the process of FIG. 11.

Through the above processes, the image-processing device 1 can extract the information (the group first feature amounts and the group second feature amounts) necessary to reduce the effort for the operator to record the record character string for each group of the document forms and accumulate the information on the database 4. Thus, the image-processing device 1 can receive an input of image data of a new document form and automatically record a record character string included in the document form on the database 4. The process will be described with reference to FIG. 12.

Figure 12:
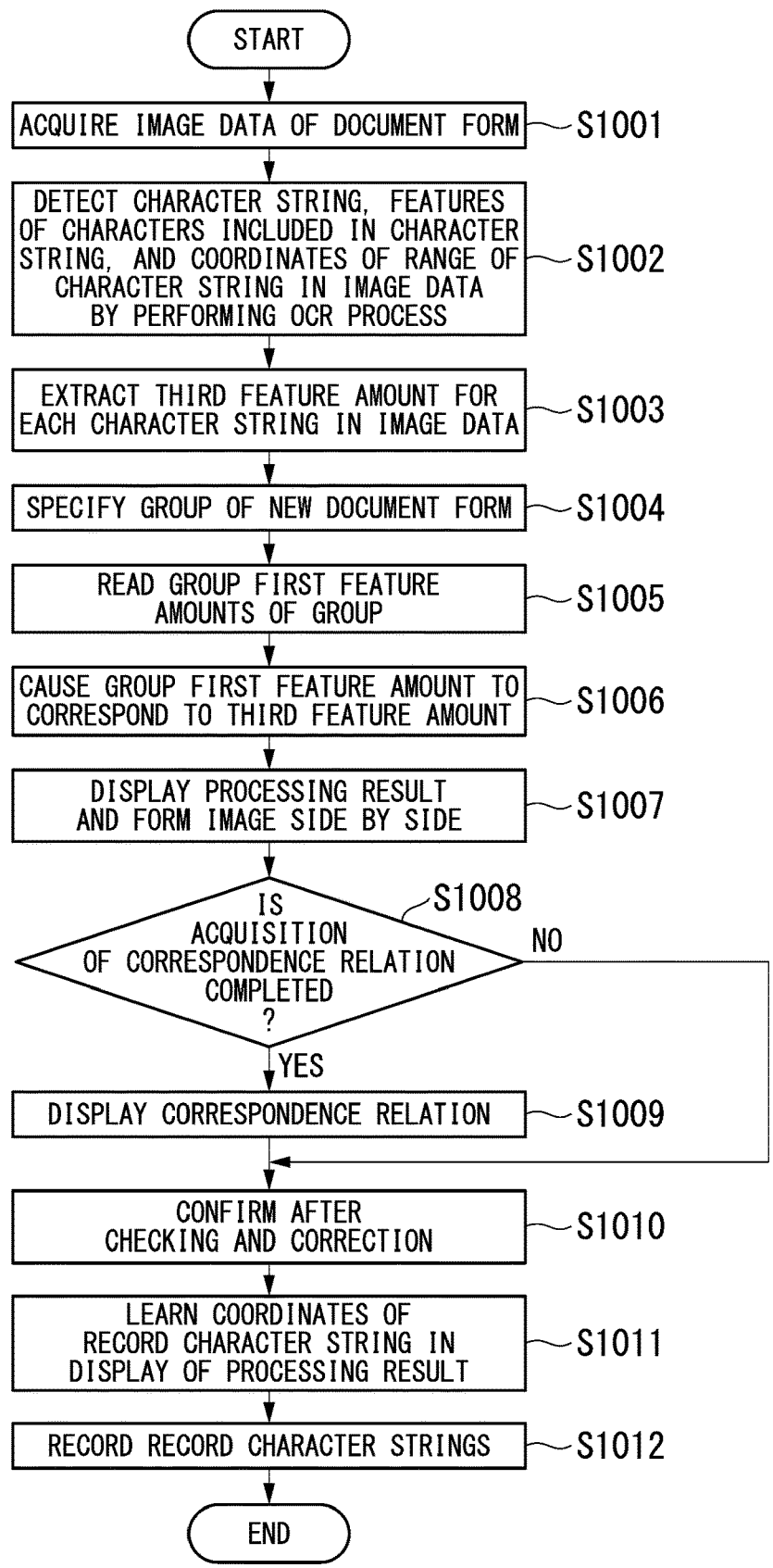
FIG. 12 is a second diagram illustrating a processing flow of the image-processing device according to the second embodiment.

FIG. 12 is a second diagram illustrating a processing flow of an image-processing device according to the second embodiment. FIG. 12 illustrates an example of a processing procedure in which the image-processing device 1 extracts the record character strings from newly input image data.

The operator performs an operation causing the image-reading device 2 to read a new document form. Then, the image-reading device 2 generates the image data of the document form and outputs (transmits) the image data to the image-processing device 1. The acquisition unit 191 of the image-processing device 1 acquires the image data from the data received by the communication unit 110 (step S1001). The acquisition unit 191 outputs the image data to the feature amount extraction unit 192. The feature amount extraction unit 192 detects a character string, the features of the characters (the character attributes) included in the character string, and the coordinates of the range of the character string in the image data for each character string by performing the OCR process on the image data (step S1002). The feature amount extraction unit 192 extracts third feature amounts obtained by processing the detected information as the feature amounts for each character string in the image data (step S1003). The third feature amounts are information indicating the features of the character string included in the document form of the newly read image data.

Subsequently, the group-specifying unit 195 reads the group second feature amounts used to specify the group of the new document form among the group second feature amounts stored on the database 4. The group second feature amounts may be, for example, feature amounts corresponding to the emblem image 502 of the ordering party displayed in the image data of the document form. The group-specifying unit 195 determines whether the information indicated in certain second feature amounts can be specified from the image data of the document form acquired in step S1001. The group-specifying unit 195 performs a similar process using the group second feature amounts of all the groups.

When the information matching the group second feature amounts read from the database 4 can be specified from the image data of the newly read document form, the group-specifying unit 195 specifies a group that has the group second feature amounts as a group of the image data of the newly read document form (step S1004).

Thereafter, the group-specifying unit 195 reads one group first feature amount or the plurality of group first feature amounts of the group from the database 4 (step S1005). The group-specifying unit 195 outputs the third feature amount and one group first feature amount or the plurality of group first feature amounts to the recording unit 193. The group first feature amount is a feature amount for specifying one recording character string or the plurality of record character strings in the document form belonging to the group.

The recording unit 193 acquires the third feature amounts for each character string and the group first feature amounts for each record character string in the image data and causes the group first feature amounts to correspond to the third feature amounts (step S1006). Specifically, the recording unit 193 causes the third feature amounts matching the group first feature amount or the closest one third feature amount to correspond to each group first feature amount. According to the correspondence, the record character string is selected among the character strings obtained by performing the OCR process on the image data of the document form.

Subsequently, the feature amount extraction unit 192 controls the display unit 120 such that the display of the record character string which is the processing result by the image-processing device 1 and the image of the document form are displayed side by side (step S1007). Step S1007 is similar to step S706 of FIG. 7.

Subsequently, the recording unit 193 determines whether the acquisition of the correspondence relation between the display of the record character string and the image of the document form is completed (step S1008). For example, the recording unit 193 determines that the acquisition of the correspondence relation is completed when the number of learnings for ascertaining the correspondence relation between the display of the record character string and the image of the document form is equal to or greater than a predetermined number of times. As described above, the learning for ascertaining the correspondence relation between the display of the record character string and the image of the document form may be learning for specifying the record character string in the display of the record character string or may be learning for specifying the record character string in the image of the document form. Alternatively, the learnings may be combined.

When it is determined that the acquisition of the correspondence relation between the display of the record character string and the image of the document form is completed (YES in step S1008), the recording unit 193 controls the display unit 120 such that the correspondence relation between the display of the record character string and the image of the document form is displayed (step S1009). Step S1009 is similar to step S708 of FIG. 7.

When the operator performs the confirming operation after the checking and correcting the record character string, the image-processing device 1 acquires the corrected record character string (step S1010). When the recording unit 193 determines in step S1008 that the acquisition of the correspondence relation between the display of the record character string and the image of the document form is not completed (NO in step S1008), the process proceeds to step S1010.

Then, the feature amount extraction unit 192 and the recording unit 193 serving as a correspondence relation learning unit learn the coordinates of the record character string in the display of the processing result (in the examples of FIGS. 8 and 9, the display window W2 of the record character string) (step S1011). For example, as in the case of the document form, the feature amount extraction unit 192 also extracts the first feature amounts of the display of the processing result and the recording unit 193 specifies and records the position of the record character string using the first feature amounts.

When the format of the display of the processing result is known in the recording unit 193, the process of step S1011 is unnecessary.

The recording unit 193 records the record character strings in the record table in association with identification information of the document form (step S1012).

For example, a case in which the third feature amount a3, the third feature amount b3, the third feature amount c3, and the third feature amount d3 are acquired from the image data of the document form will be exemplified. A case in which the third feature amount a3 matches the first feature amount a1 recorded in advance on a database, the third feature amount b3 matches the first feature amount b1, the third feature amount c3 matches the first feature amount c1, and the third feature amount d3 matches the first feature amount d1 will be exemplified. In this case, the recording unit 193 records the character strings corresponding to the third feature amount a3, the third feature amount b3, the third feature amount c3, and the third feature amount d3 as the record character strings on the record table of the document form. The character strings corresponding to the third feature amounts mentioned here are character strings of extraction sources of the third feature amounts. When the operator corrects the record character string, the recording unit 193 records the corrected record character string in the recording table of the document form.

After step S1012, the image-processing device 1 ends the process of FIG. 12.

The image-processing device 1 may update the first feature amounts in the document form in the process of FIG. 12. For example, the image-processing device 1 may learn the first feature amounts in the document form in step S1011 in addition to or instead of the machine learning of the first feature amounts in the display of the processing result. In this case, the image-processing device 1 may re-perform the processing flow of FIG. 6. Alternatively, the image-processing device 1 may update the first feature amounts without re-performing the process on the data processed in FIG. 6 by performing additional learning in step S1011.

The image-processing device 1 updates the first feature amounts through the process of FIG. 12 to increase the number of pieces of sample data, and thus an improvement in precision of the first feature amounts is achieved and an improvement in precision in which the image-processing device 1 extracts the recording character strings is expected. When a record character string is added through the process of FIG. 12, the image-processing device 1 can also extract a newly added recording character string from image data, and thus a reduction in the effort for the operator to input the character string is expected.

Through the process illustrated in FIG. 12, the image-processing device 1 can automatically record the record character strings in the image data of the document form irrespective of the kind of newly input document form in accordance with the record character strings and the image data of the document form of each of the plurality of formats recorded in advance by the operator. Accordingly, the image-processing device 1 can reduce the effort for the operator to record the record character string in the document form. The operator can check and correct the record character string which is a processing result of the image-processing device 1 with reference to the display of the display unit 120. At this time, the display unit 120 displays the correspondence relation between the character string in the display of the processing result and the character string in the image of the document form, and thus the operator can easily ascertain the correspondence relation.

Third Embodiment

As another example of the process of the image-processing device 1, the operator may register a group of document forms beforehand in the image-processing device 1. For example, when the operator registers the image data of the document forms in the past, the operator inputs group identifiers in accordance with the kinds of document forms to register the group identifiers in association with the image data of the document forms on the database 4 beforehand. Then, different kinds of forms are not mixed due to a mistake or the like of the process of the image-processing device 1 in the same group, and thus the first feature amounts can be extracted with high precision. In this case, at the time of registration, the operator specifies a group of a new form using the second feature amounts as in step S1004 while inputting the group of the document form.

Fourth Embodiment

As still another example of the process of the image-processing device 1, the image-processing device 1 may not only group the document forms by using the second feature amounts but also group the document forms by using the first feature amounts or the first feature amounts with the second feature amounts. The first feature amounts are the feature amounts of the record character string, but the coordinates of the record character string or the character attributes are considered to be the same as long as the document forms are the same kind of document forms, and thus the forms can be grouped using the first feature amounts. The operator can perform the first grouping according to a fourth embodiment and can read the record character string with high precision in an OCR process by grouping new document forms using the first feature amounts through the process of step S1004.

In this case, the acquisition unit 191 acquires the image data of a plurality of pieces of form image data and record character strings which are recording targets among the character strings included in the form image data. Then, the grouping unit 194 groups the form image data based on the first feature amounts. The feature amount extraction unit 192 extracts the record character string using the first feature amounts corresponding to the form image data included in the group.

Fifth Embodiment

In the second embodiment, the group of the new form is specified based on the second feature amount in step S1004. However, as another processing mode, the image-processing device 1 specifies all the groups set by the operator in order for each group, reads the first feature amounts, and counts the number of feature amounts matching the third feature amounts without performing a process of specifying the group. In the case of a correct group, the most first feature amounts ought to match the most third feature amounts. Therefore, the image-processing device 1 records the character string included in each of the third feature amounts of a specific group when the number of feature amounts matching each other is the most. Thus, even when no group is specified, the record character string can be recorded.

In this case, the acquisition unit 191 acquires the image data of a plurality of pieces of form image data and record character strings which are recording targets among the character strings included in the form image data. Then, the feature amount extraction unit 192 extracts the first feature amounts indicating features of the record character string or the second feature amounts indicating recognition information other than the record character string based on the recognition result of the form image data acquired by the acquisition unit 191. The feature amount extraction unit 192 extracts the record character string using the first feature amounts corresponding to the form image data included in a predetermined group set in advance.

As described above, the recording unit 193 detects a character string of a specific item in the first document image based on the feature amount of the displayed first document image among feature amounts which are recorded in advance based on a result of learning using a plurality of document images and indicate features of the character string of the item for each kind of document image and each specific item. The display unit 120 outputs correspondence relation information indicating the same specific item between the first document image and the second document image displayed to correspond to the first document image.

In the image-processing device 1, the position of the character string in the document image can be acquired by learning. Accordingly, in the image-processing device 1, even when the format of a character recognition target document is not known in advance, it is possible to assist the operator to ascertain which item is shown and where the item is shown.

The recording unit 193 detects the character string of the same item as the specific item in the first document image from the second document image.

Thus, the image-processing device 1 can present the user with the correspondence relation between the character string of the specific item in the first document image and the character string of the specific item in the second document image. The user can check an incorrect or correct character string relatively easily by referring to the presentation of the correspondence relation.

The feature amount extraction unit 192 and the recording unit 193 perform the machine learning of the correspondence relation of the same specific item between the first and second document images.

Thus, in the image-processing device 1, special handling of the user is unnecessary and the correspondence relation of the same specific item between the first and second document images can be automatically learned. Since the user only has to perform a normal process, a burden on the user does not increase.

The feature amount extraction unit 192 and the recording unit 193 perform the machine learning of the correspondence relation of the same specific item between the first and second document images using an image after the character string of the second document image is confirmed.

When the character string of the second document image is confirmed, the confirmed character string is considered to be correct. The correspondence relation learning unit is expected to learn the correspondence relation of the same specific item between the first and second document images with relatively high precision by performing machine learning using the correct character string.

Next, a configuration according to an embodiment of the present invention will be described with reference to FIG. 13.

Figure 13:
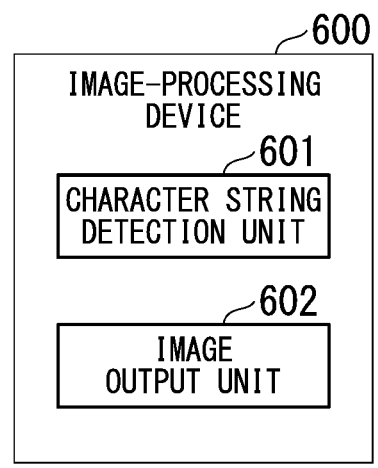
FIG. 13 is a diagram illustrating an example of a configuration of an image-processing device according to an embodiment.

FIG. 13 is a diagram illustrating an example of a configuration of an image-processing device according to an embodiment. An image-processing device 600 illustrated in FIG. 13 includes a character string detection unit 601 and an output unit 602.

In the configuration, the character string detection unit 601 detects a character string of a specific item in the first document image based on the feature amount of the displayed first document image among feature amounts which are recorded in advance based on a result of learning using a plurality of document images and indicate features of the character string of the item for each kind of document image and each specific item.

The output unit 602 outputs correspondence relation information indicating the same specific item between the first document image and the second document image displayed to correspond to the first document image.

In the image-processing device 600, the position of the character string in the document image can be acquired by learning. Accordingly, in the image-processing device 600, even when the format of a character recognition target document is not known in advance, it is possible to assist the operator to ascertain which item is shown and where the item is shown.

Each device described above contains a computer system. A program causing each device to perform each process described above is stored in a computer-readable recording medium of the device. Thus, a computer of each device reads and executes the program to perform the above process. Here, the computer-readable recording medium is a magnetic disk, a magneto-optic disc, a CD-ROM, a DVD-ROM, a semiconductor memory, or the like.

The computer program may be delivered to a computer via a communication line and the computer receiving the computer program may execute the program.

The program may be a program that realizes some of the functions of the above-described processing units. Further, the above-described functions may be so-called differential files (differential programs) that are realized in combination with programs which have already been recorded on a computer system.

The embodiments of the present invention have been described in detail with reference to the drawings, but specific configurations are not limited to the embodiments and designs and the like are also included within the scope of the present invention without departing from the gist of the present invention.

Priority is claimed on Japanese Patent Application No. 2018-071143, filed Apr. 2, 2018, the content of which is incorporated herein by reference.

INDUSTRIAL APPLICABILITY

According to the present invention, even when the format of a character recognition target document is not known in advance, it is possible to assist the operator to ascertain which item is shown and where the item is shown.

REFERENCE SIGNS LIST

1 Image-processing device
2 Image-reading device
3 Recording device
4 Database
110 Communication unit
120 Display unit
130 Operation input unit
180 Storage unit
190 Control unit
191 Acquisition unit
192 Feature amount extraction unit

The invention claimed is:
1. An image-processing device, comprising:
at least one memory configured to store instructions; and
at least one processor configured to execute the instructions to;
detect a character string of a first item in a first document image for recognition target, based on a feature value of an item included in the first document image among feature values, the feature values being recorded in advance based on a result of learning by using a plurality of document images, the feature values indicating features of attributes of characters included in the character string of the item for each item in the plurality of document images; and
output the first document image, a second document image and information regarding a correspondence relation indicating the item that is the same between the first document image and the second document image, wherein the second document image is a recognition result of the first document image.

2. The image-processing device according to claim 1, wherein the at least one processor is further configured to execute the instructions to:
receive an operation of correcting the character string; and
record the character string that is corrected by the received operation of correcting.

3. The image-processing device according to claim 1, wherein the feature values are extracted on the basis of the attributes of the characters included in the character string of the item and information indicating a position of the character string of the item in the first document image.

4. The image-processing device according to claim 3, wherein the attributes of the characters indicate at least one of numbers, alphabetical letters, hiragana letters, kanji, number of characters, character heights, and fonts.

5. The image-processing device according to claim 1, wherein the at least one processor is configured to execute the instructions to output an image in which a range of each of candidates for the character string of the item in the first document image.

6. The image-processing device according to claim 1, wherein the at least one processor is configured to execute the instructions to output the information regarding the correspondence relation based on a result of machine learning of the correspondence relation between a character string included in a training document image and a character string included in a third document image which is a recognition result of the training document image.

7. An image-processing method, comprising:
detecting a character string of a first item in a first document image for recognition target, based on a feature value of an item included in the displayed first document image among feature values, the feature values being recorded in advance based on a result of learning by using a plurality of document images, the feature values indicating features of attributes of characters included in the character string of the item for each item in the plurality of document images; and
outputting the first document image, a second document image and information regarding a correspondence relation indicating the item that is the same between the first document image and the second document image, wherein the second document image is a recognition result of the first document image.

8. A non-transitory computer-readable storage medium that stores a program causing a computer to perform processes of:
detecting a character string of a first item in a first document image for recognition target, based on a feature value of an item included in the first document image among feature values, the feature values being recorded in advance based on a result of learning by using a plurality of document images, the feature values indicating features of attributes of characters included in the character string of the item for each item in the plurality of document images; and outputting the first document image, a second document image and information regarding a correspondence relation indicating the item that is the same between the first document image and the second document image, wherein the second document image is a recognition result of the first document image.

\* \* \* \* \*